(12) United States Patent
Feeney et al.

(10) Patent No.: US 11,238,059 B2
(45) Date of Patent: Feb. 1, 2022

(54) FACILITATING CONSTRUCTION OF A USER INTERFACE

(71) Applicant: DATA CHEMIST LIMITED, Dublin (IE)

(72) Inventors: Kevin Feeney, Dublin (IE); Gavin Mendel-Gleason, Dublin (IE)

(73) Assignee: Data Chemist Limited, Dublin (IE)

( * ) Notice: Subject to any disclaimer, the term of this patent is extended or adjusted under 35 U.S.C. 154(b) by 86 days.

(21) Appl. No.: 16/880,880

(22) Filed: May 21, 2020

(65) Prior Publication Data
US 2020/0372038 A1    Nov. 26, 2020

(30) Foreign Application Priority Data
May 23, 2019    (GB) ..................................... 1907281

(51) Int. Cl.
| | | |
|---|---|---|
| *G06F 16/00* | (2019.01) | |
| *G06F 16/25* | (2019.01) | |
| *G06F 16/22* | (2019.01) | |
| *G06F 16/21* | (2019.01) | |
| *G06F 8/38* | (2018.01) | |

(52) U.S. Cl.
CPC .............. *G06F 16/252* (2019.01); *G06F 8/38* (2013.01); *G06F 16/212* (2019.01); *G06F 16/2272* (2019.01); *G06F 16/2282* (2019.01)

(58) Field of Classification Search
CPC .......... G06F 16/252; G06F 8/38; G06F 16/21; G06F 16/2365; G06F 16/2272; G06F 16/212
See application file for complete search history.

(56) References Cited

U.S. PATENT DOCUMENTS

| | | | |
|---|---|---|---|
| 2006/0041877 A1 | 2/2006 | Harsh et al. | |
| 2007/0192272 A1* | 8/2007 | Elfayoumy | G06F 16/36 706/55 |
| 2007/0233457 A1* | 10/2007 | Kang | G06F 16/367 704/8 |

(Continued)

OTHER PUBLICATIONS

European Search Report for European Patent Application No. 20175894.3, dated Aug. 20, 2020, 8 pages.

(Continued)

*Primary Examiner* — Cheryl Lewis
(74) *Attorney, Agent, or Firm* — Patterson + Sheridan LLP

(57) ABSTRACT

A method of facilitating construction of a user interface for policing input of user-defined data to a database. An ontology expressed in a first-order logic language is obtained, the ontology describing one or more predefined classes, a plurality of predefined properties and at least one predefined restriction. Data useable to identify a first class is received, and in response, an intermediate data structure is generated for the first class, the intermediate data structure configured to facilitate construction of a user interface for policing input of user-defined data to the database. Generating the intermediate data structure comprises identifying a property from the ontology that is applicable to the first class, determining a property restriction function indicating whether the at least one restriction is applicable to the property, and associating the at least one restriction with the property in the intermediate data structure.

20 Claims, 11 Drawing Sheets

(56) References Cited

U.S. PATENT DOCUMENTS

2010/0131516 A1* 5/2010 Jean-Mary ............ G06F 16/951
 707/749
2016/0321021 A1 11/2016 Derut et al.

OTHER PUBLICATIONS

Gaulke et al., "Using profiled ontologies to leverage model driven user interface generation", Proceedings of the 7th ACM SIGCHI Symposium on Engineering Interactive Computing Systems, EICS '15, Jan. 1, 2015, pp. 254-259.
Hitz et al., "Using Application Ontologies for the Automatic Generation of User Interfaces for Dialog-Based Applications", 10th IFIP WG 8.99 Working Conference, CONFENIS 2016, Vienna, Austria, Dec. 2016, pp. 16-31.

* cited by examiner

600

```
:governedBy
   a owl:ObjectProperty ;
   rdfs:label "Governed By"@en ;
   rdfs:comment "Government Body"@en ;
   rdfs:domain :City ;
   rdfs:range :GovernmentBody .

:sisterCity
   a owl:ObjectProperty ;
   rdfs:label "Sister City"@en ;
   rdfs:comment "Sister City"@en ;
   rdfs:domain :City ;
   rdfs:range :City .

:hasExecutive
   a owl:ObjectProperty ;
   rdfs:label "has Executive"@en ;
   rdfs:domain :GovernmentBody ;
   rdfs:range :Executive .

:hasCouncillor
   a owl:ObjectProperty ;
   rdfs:label "has Councillor"@en ;
   rdfs:domain :Executive ;
   rdfs:range :Person .

:firstName
   a owl:DatatypeProperty ;
   rdfs:label "First name"@en ;
   rdfs:domain :Person ;
   rdfs:range xsd:string .

:lastName
   a owl:DatatypeProperty ;
   rdfs:label "Second name"@en ;
   rdfs:domain :Person ;
   rdfs:range xsd:string .
```

```
[
  {
    "type":"datatypeProperty",
    "domain":"City",
    "property":"hasPopulation",
    "restriction": {"cardinality":1},
    "range":"xsd:integer"
  }
  {
    "type":"objectProperty",
    "property":"sisterCity",
    "restriction":"true",
    "domain":"City",
    "range":"City",
    "frame": [{"type":"entity", "class":"City"}]
  }
  {
    "type":"objectProperty",
    "domain":"City",
    "property":"governedBy",
    "range":"Government Body",
    "frame": ....
  }
]
```

*FIG. 6C*

FACILITATING CONSTRUCTION OF A USER INTERFACE

CROSS-REFERENCE TO RELATED APPLICATIONS

This Application claims priority to United Kingdom Application No. GB 1907281.8, filed May 23, 2019, the contents of which are incorporated herein in their entirety.

INTRODUCTION

Technical Field

The present disclosure relates to facilitating construction of a user interface. In particular, the present disclosure relates to facilitating construction of a user interface for policing input of user-defined data to a database.

BACKGROUND

Databases are organized, structured sets of data. Databases may be stored, accessed, queried, interrogated and/or updated via a computer system.

A database can be updated via input of user-defined data (e.g. new data to be stored in the database, deletion of currently stored data, or modification of existing data). A user interface may be employed to allow input of user-defined data to the database. Such a user interface may comprise a graphical user interface, displayed on a user device, for example. In some known systems, a user is required to construct a data-model in the database, to develop custom queries for the extraction of such data, and to develop custom web form applications which allow users to enter data into such forms to update the database. Such methods may, however, be relatively complex and/or time-consuming, and may need to be repeated in a bespoke fashion whenever a new database is generated and/or whenever the rules of a given database are changed.

Further, some known systems may permit a user to input data which does not conform to the particular rules or structure required by the database. That is, a user may be able to enter invalid data into the database. This may lead to errors and/or malfunctioning of the database, and/or may reduce the reliability and integrity of the data stored therein. The input of user-defined data to the database may not be policed or validated at all in some known systems. In other known systems, some validation of the user-defined data may be performed, but such validation procedures are constructed by hand (e.g. as part of a bespoke computer program). This may be a relatively complex, time-consuming and/or error-prone process. Moreover, in some known systems, to reduce the occurrence of invalid data being input to the database, user interfaces and/or validation procedures may be made overly restrictive, thereby not allowing a user to input data conforming to some data shapes that should in fact be permitted.

It is therefore desirable to provide improved methods for policing input of user-defined data to databases. In particular, it is desirable to provide improved methods for facilitating construction of user interfaces for policing input of user-defined data to databases.

BRIEF SUMMARY

According to a first aspect, there is provided a method of facilitating construction of a user interface for policing input of user-defined data to a database, the method comprising: obtaining an ontology expressed in a first-order logic language, the ontology describing one or more predefined classes, a plurality of predefined properties and at least one predefined restriction; receiving data useable to identify a first class of the one or more classes; in response to the receiving, generating, for the first class, an intermediate data structure configured to facilitate construction of the user interface for policing input of user-defined data to the database; and outputting the intermediate data structure to cause construction of the user interface, wherein generating the intermediate data structure comprises: identifying at least one property of the plurality of properties from the ontology that is applicable to the first class; including the at least one property in the intermediate data structure; determining, for the at least one property, a property restriction function indicating whether the at least one restriction from the ontology is applicable to the at least one property; and in response to the property restriction function indicating that the at least one restriction is applicable to the at least one property, associating the at least one restriction with the at least one property in the intermediate data structure.

The method of the first aspect enables a user interface to be generated which corresponds to particular database specifications that are defined by the ontology. In other words, generating the intermediate data structure ensures that the resulting user interface encapsulates acceptable data shapes that are specified by the ontology. Therefore, the user interface is automatically endowed with the correct rules and/or structure as described in the ontology. Further, the method of the first aspect allows the rules used for data validation to be obtained from the ontology itself, rather than having to be encoded by hand into a bespoke computer program. By using an ontology expressed in a first-order logic language, policing of input data may be data model-driven as opposed to programmer-driven. Data validation is therefore dealt with centrally and more efficiently. Data validation also corresponds more closely to the specification defined in the ontology. Further, relatively sophisticated descriptions of objects and logic can be constructed in an ontology, and from these specifications relatively complex user interfaces can be automatically constructed. This reduces the application development time for new data use scenarios, and increases the versatility and/or flexibility of data modelling using databases.

Moreover, the method of the first aspect enables the construction of user interfaces which allow users to enter data to the database in such a way that they cannot enter data that does not conform to the underlying data model (i.e. the ontology), and can enter all possible valid data, should they choose to do so. In other words, the method facilitates the construction of user interfaces which allow a user to input exactly the set of valid instance data shapes as defined by the data model described in the ontology. The generated user interface permits a user to input valid data but not invalid data, and allows the user to input all valid shapes of input data. That is, user-defined data input to the database via the generated user interface is guaranteed to be conformant to the ontology, through use of the intermediate data structure. This allows the integrity of the database, and of the data stored therein, to be increased.

The intermediate data structure is generated such that specific instance data can be inserted into the intermediate data structure in a deterministic way, guaranteeing that the inserted data will conform to the rules specified in the data model described in the ontology. Further, the use of the intermediate data structure enables the user interface to be subsequently generated without specific knowledge of the data model defined in the ontology, or any components of the data model, or any of the logic implied within the data model. The intermediate data structure may be interpretable (e.g. by a processor executing a set of instructions) to deterministically generate the user interface. By translating from the first-order logic of the ontology to the intermediate data structure (which may have its own distinct logic), the user interface may be generated from the intermediate data structure without requiring specific details of the ontology to be known. For example, the intermediate data structure may be generated from the ontology at a server, and the subsequent user interface may be generated at a client device that receives the intermediate data structure from the server. Therefore, the client device need not be aware of the data model defined in the ontology.

According to a second aspect, there is provided a computer program product comprising a non-transitory computer-readable storage medium having computer-readable instructions stored thereon, the computer-readable instructions being executable by a computerized device to cause the computerized device to perform a method of facilitating construction of a user interface for policing input of user-defined data to a database, the method comprising: obtaining an ontology expressed in a first-order logic language, the ontology describing one or more predefined classes, a plurality of predefined properties and at least one predefined restriction; receiving data useable to identify a first class of the one or more classes; in response to the receiving, generating, for the first class, an intermediate data structure configured to facilitate construction of the user interface for policing input of user-defined data to the database; and outputting the intermediate data structure to cause construction of the user interface, wherein generating the intermediate data structure comprises: identifying at least one property of the plurality of properties from the ontology that is applicable to the first class; including the at least one property of the plurality of properties from the ontology in the intermediate data structure; determining, for the at least one property, a property restriction function indicating whether the at least one restriction from the ontology is applicable to the at least one property; and in response to the property restriction function indicating that the at least one restriction is applicable to the at least one property, associating the at least one restriction with the at least one property in the intermediate data structure.

According to a third aspect, there is provided apparatus comprising at least one processor and at least one memory including computer program code, the at least one memory and the computer program code being configured to, with the at least one processor, cause the apparatus at least to perform a method of facilitating construction of a user interface for policing input of user-defined data to a database, the method comprising: obtaining an ontology expressed in a first-order logic language, the ontology describing one or more predefined classes, a plurality of predefined properties and at least one predefined restriction; receiving data useable to identify a first class of the one or more classes; in response to the receiving, generating, for the first class, an intermediate data structure configured to facilitate construction of the user interface for policing input of user-defined data to the database; and outputting the intermediate data structure to cause construction of the user interface, wherein generating the intermediate data structure comprises: identifying at least one property of the plurality of properties from the ontology that is applicable to the first class; including the at least one property in the intermediate data structure; determining, for the at least one property, a property restriction function indicating whether the at least one restriction from the ontology is applicable to the at least one property; and in response to the property restriction function indicating that the at least one restriction is applicable to the at least one property, associating the at least one restriction with the at least one property in the intermediate data structure.

It should be appreciated that features described in relation to one aspect of the present disclosure may be incorporated into other aspects of the present disclosure. For example, a method aspect may incorporate any of the features described with reference to an apparatus aspect and vice versa.

DESCRIPTION OF THE DRAWINGS

Embodiments of the present disclosure will now be described by way of example only with reference to the accompanying schematic drawings of which:

FIGS. 6A and 6B show an ontology according to embodiments of the present disclosure;

FIG. 6C shows a portion of an intermediate data structure according to embodiments of the present disclosure;

DETAILED DESCRIPTION

Figure 1:
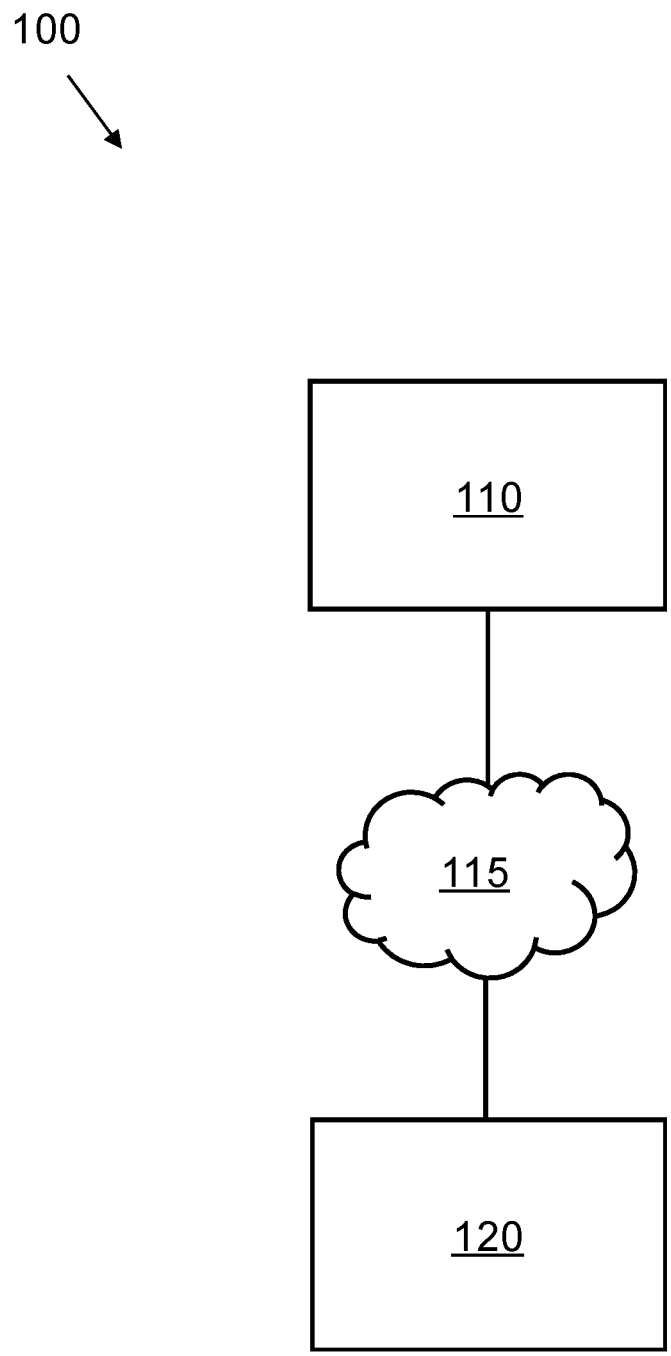
FIG. 1 shows a schematic view of a system for facilitating construction of a user interface according to embodiments of the present disclosure.

Referring to FIG. 1, there is shown an example of a system 100. The system 100 is used to facilitate construction of a user interface for policing input of user-defined data to a database, as will be described in more detail below. The system 100 includes a server apparatus 110 and a client apparatus 120. The system 100 may include at least one additional apparatus (not shown). The server apparatus 110 and/or client apparatus 120 may comprise one or more components. The one or more components may be implemented in hardware and/or software. The one or more components may be co-located or may be located remotely from each other in the system 100. Examples of types of apparatus include, but are not limited to, computerized devices, handheld or laptop computers, tablets, mobile devices, server devices and distributed computing equipment. The server apparatus 110 and/or the client apparatus 120 may be embodied as one or more software functions and/or hardware modules.

The server apparatus 110 is communicatively coupled to the client apparatus 120 via a data communications network 115. Examples of the data communications network 115 include, but are not limited to, the Internet, a Local Area Network (LAN) and a Wide Area Network (WAN). The server apparatus and/or the client apparatus 110, 120 may have a wired and/or wireless connection to the data communications network 115. Data communications network 115 may comprise a wireless network, a wired network and/or various combinations of multiple wireless and wired network parts.

In embodiments of the present disclosure, the server apparatus 110 and/or the client apparatus 120 is configured to facilitate construction of a user interface for inputting data to a database, as will be described in more detail below. Such a database may be a graph database, in some embodiments. Briefly, a graph database includes a plurality of nodes connected by edges. The nodes can represent entities, instances, items or suchlike. The edges indicate relationships between nodes in the plurality of nodes. The edges may be directed or undirected. The graph database can also include properties which indicate information relating to one or more nodes and/or edges. A graph database uses one or more graph structures (comprising nodes, edges and/or properties) to represent and store data. Relationship data, namely data pertaining to relationships between nodes, can be stored, queried, modified and/or retrieved through use of the graph database. The graph database may be stored using a non-relational storage engine or a relational storage engine. The database is a different type of database in alternative embodiments. For example, the database may be a relational database.

In embodiments, the database is stored on the server apparatus 110. In alternative embodiments, the database is stored on one or more other entities. For example, the database may be partitioned and different partitions may be stored on one or more different entities. The server apparatus 110 may be configured to query, update and/or interrogate the database in such alternative embodiments by transmitting and/or receiving data via one or more data communications networks, e.g. network 115.

A user interface may be used to input user-defined data to the database. Such a user interface may be generated on the client apparatus 120, according to embodiments. For example, the user interface may be generated within a web application. The user interface may comprise one or more forms to allow input of user-defined instance data. A user may input data via the user interface on the client apparatus 120, and the client apparatus 120 may subsequently transmit data to the server apparatus 110 to cause the server apparatus 110 to update the database.

Figure 2:
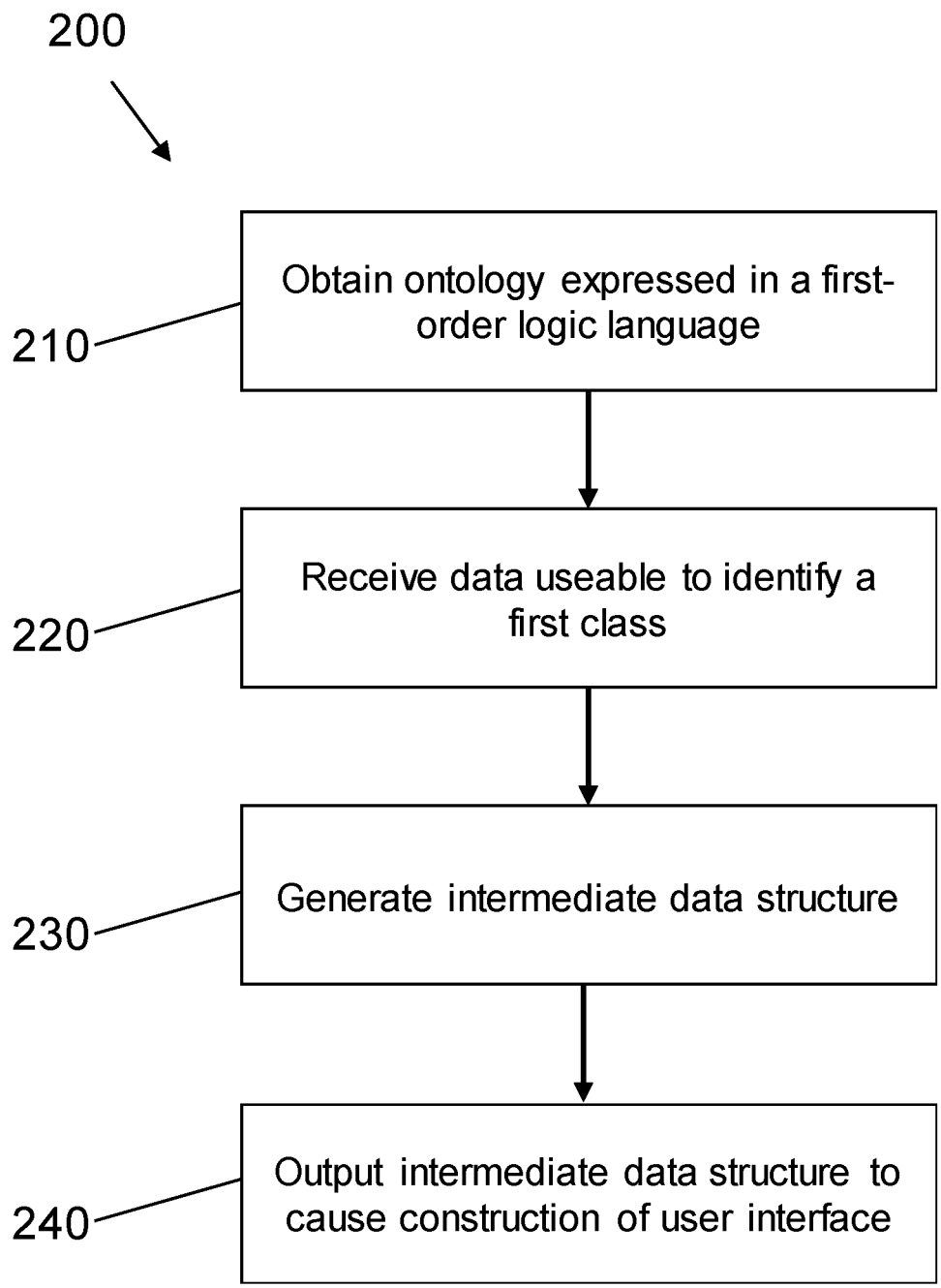
FIG. 2 shows a flow chart depicting a method of facilitating construction of a user interface according to embodiments of the present disclosure.

Referring to FIG. 2, there is shown a method 200 of facilitating construction of a user interface according to embodiments of the present disclosure. The method 200 may be performed by an apparatus such as the server apparatus 110 and/or the client apparatus 120 described above.

At item 210, an ontology is obtained. The ontology may be associated with a database. An ontology may be considered to comprise a formal representation, naming and definition of categories, properties and relations between concepts, data and/or objects within one or more domains. The ontology may describe a set of classes, properties and/or restrictions that define particular data shapes. As such, a particular data model described by the ontology may be used to endow a database associated with the ontology with particular rules, structure and/or shapes.

The ontology is expressed in a first-order logic language. In embodiments, the first-order logic language comprises a Web Ontology Language (OWL). The ontology describes one or more predefined classes. A class may be considered as an abstract specification of a particular object. The ontology also describes a plurality of predefined properties. A property may be considered an element with a name and unique identifier (e.g. a Uniform Resource Identifier), which may belong to one or more classes according to the ontology. A property may have a domain, which specifies the class or classes to which the property belongs. The property may also have a co-domain or range, which specifies either a class or a data type. The ontology may describe how a given class is related to other classes, as well as which properties are applicable to the given class. The ontology also describes at least one predefined restriction. The at least one predefined restriction may be applicable to one or more properties and/or one or more classes according to the ontology. An example of a restriction, also referred to as a "constraint", is a cardinality restriction. Other examples of restrictions relate to aspects of a given datatype, such as whether the given datatype is accepted by a given regular language, or whether it is within a predefined mathematical range.

At item 220 of the method 200, data useable to identify a first class of the one or more classes is received. In embodiments, for example where the method 200 is performed by the server apparatus 110, such data is received from the client apparatus 120 via the network 115. In alternative embodiments, the data is not received from the client apparatus 120 via the network 115.

In embodiments, the received data comprises a Uniform Resource Indicator (URI). The received data may comprise a different type of indicator in alternative embodiments. In some examples, the received data indicates the first class. In other examples, the received data comprises an indicator for an object belonging to the first class. In such cases, the first class is determined using the indicator for the object. For example, the first class may be determined for a given object from type labelling information present in the database (e.g. inheritance or containment information). As such, the first class may be identified directly or indirectly based on the received data.

In embodiments, the received data is user-defined. For example, the data may be received via user input at a graphical user interface. In some examples, the data is received at the client apparatus 120, before being sent via the network 115 to the server apparatus 110 for processing.

At item 230, in response to receiving the data at item 220, an intermediate data structure is generated for the first class. The intermediate data structure is configured to facilitate construction of a user interface for policing input of user-defined data to a database.

Generating the intermediate data structure comprises identifying at least one property of the plurality of properties from the ontology that is applicable to the first class. In embodiments, identifying the at least one property is based on a domain field of the at least one property specifying the first class. Alternatively, the domain field of the at least one property may specify a further class that subsumes the first class in the ontology. The identified at least one property is included in the intermediate data structure. Additionally, a property restriction function is determined for the at least one property. The property restriction function indicates whether the at least one restriction from the ontology is applicable to the at least one property. In response to the property restriction function indicating that the at least one restriction is applicable to the at least one property, the at least one restriction is associated with the at least one property in the intermediate data structure. In embodiments, in response to the property restriction function indicating that the at least one restriction is not applicable to the at least one property, the at least one restriction function is not associated with the at least one property in the intermediate data structure.

Therefore, according to embodiments of the present disclosure, the intermediate data structure comprises definitions of which properties are available to the first class, and the constraints which are applicable to those properties and/or to the first class. The intermediate data structure may also specify the types of such properties. The intermediate data structure may have a unique URI that indicates the class to which the data structure belongs (e.g. the first class). In embodiments, the intermediate data structure comprises a label indicating the name of the first class.

The user interface that may be constructed based on the intermediate data structure allows the user to choose what instance data to input, in such a way that the choices provided to the user are sufficiently broad that they provide the user with the ability to input any and all possible valid input data combinations, while preventing the user from inputting invalid input data combinations.

In embodiments, generating the intermediate data structure involves interpreting the ontology using a closed-world assumption (CWA). A CWA is a logical assumption that what is not currently known to be true, is false. This is in contrast to an open-world assumption (OWA), which is the assumption that a statement may be true irrespective of whether or not it is currently known to be true. The CWA facilitates the definition of all data shapes that are valid in the ontology, and enforces the rules of the data model described in the ontology. Therefore, the CWA facilitates the construction of user interfaces which permit only valid data (and not invalid data) to be inputted. In a comparative case in which the ontology is interpreted using an OWA, the input of invalid data may cause the underlying data model to change. That is, the rules of the data model may be adjusted to accommodate the new data. By using the CWA, on the other hand, the data model does not change upon input of invalid data, and the rules of the data model are upheld, thereby increasing the integrity of the data model and consequently of the database itself.

In embodiments, generating the intermediate data structure comprises identifying a group of multiple properties, from the plurality of properties, that is applicable to the first class. The above-described steps of including the property in the intermediate data structure, determining the property restriction function for the property and conditionally associating the restriction with the property in the intermediate data structure may be repeated for each property in the group of multiple properties. As such, the intermediate data structure may describe every property which is available to the first class, and the restrictions which apply to those properties.

The ontology may describe a plurality of predefined classes including the first class. In embodiments, generating the intermediate data structure comprises deriving a class relationship function for the first class. The class relationship function indicates a relationship in the ontology between the first class and at least one further class of the plurality of classes. Examples of such relationships include subsumption by a further class, equivalence of a further class, intersection of a set of further classes, union of a set of further classes, and inversion of a further class. As such, the intermediate data structure may be generated on the basis of relationships between classes in the ontology, and such relationships may be taken into account when generating the intermediate data structure. This means that more detailed and/or accurate information from the ontology can be encoded in the intermediate data structure (and consequently used to generate the user interface) compared to a case in which the class relationship function is not derived.

In embodiments, the class relationship function indicates that the first class subsumes at least one further class in the ontology. In such embodiments, generating the intermediate data structure for the first class may comprise generating an intermediate data structure for the at least one further class. The intermediate data structure for the at least one further class comprises one or more properties from the ontology that are applicable to the at least one further class. Where the first class subsumes the at least one further class in the ontology, the intermediate data structure for the first class may subsume the intermediate data structure for the at least one further class. As such, the intermediate data structure for the first class may comprise a nested structure, encompassing sub-structures corresponding to classes that are subsumed by the first class. This allows the resulting user interface to include relevant information and fields not only for the first class itself, but for classes which are encompassed by the first class, thereby providing a more complete, versatile and user-friendly user interface.

In embodiments, generating the intermediate data structure for the first class comprises deriving, based on the class relationship function, a class restriction function for the first class. The class restriction function indicates one or more restrictions from the ontology that are related to the first class. The class restriction function may be used to derive the property restriction function for the at least one property, as will be described in more detail below. By deriving a class restriction function based on the class relationship function, restrictions that are related to the first class may be more accurately determined (and optionally associated with properties) compared to a case in which such a class restriction function is not determined. For example, if the class relationship function indicates that the first class is subsumed by a further class, restrictions that are applicable to that further class may, due to the subsumption, also be applicable to the first class.

In embodiments, generating the intermediate data structure for the first class comprises identifying, based on the at least one property, a second class of the plurality of classes. At least one first further property of the plurality of properties from the ontology may be identified. The at least one first further property is applicable to the second class. The above-described steps of including the property in the intermediate data structure, determining the property restriction function for the property and conditionally associating at least one restriction with the property in the intermediate data structure may be repeated for the at least one first further property. As such, the intermediate data structure for the first class may include not only properties which are applicable to the first class itself, but also properties which are applicable to a second class which is indicated by a property that is applicable to the first class.

In embodiments, the second class is subsumed by the first class in the ontology. The at least one property that is applicable to the first class may comprise a domain field and a range field in the ontology. The domain field specifies the first class (indicating that the at least one property is applicable to the first class). The range field specifies the second class. Therefore, the second class is identifiable based on the range field of the at least one property that is applicable to the first class. Therefore, the intermediate data structure for the first class may include properties which are applicable to the first class itself, and properties which are applicable to a class which is subsumed by the first class in the ontology, as well as restrictions from the ontology which are applicable to such properties.

In embodiments, the intermediate data structure for the first class comprises a hierarchical structure having multiple tiers. A first tier of the hierarchical structure comprises the at least one property of the plurality of properties (the at least one property being applicable to the first class). A second, different, tier of the hierarchical structure comprises the at least one first further property of the plurality of properties (the at least one first further property being applicable to the second class). As such, different tiers of the hierarchical structure may correspond to different classes in the ontology. Where the second class is subsumed by the first class in the ontology, the second tier of the hierarchical structure may be below the first tier of the hierarchical structure.

In embodiments, generating the intermediate data structure for the first class comprises identifying, based on the at least one property that is applicable to the first class, a third class of the plurality of classes. The third class may be specified, for example, in the range field of the at least one property. In response to determining that the third class is associated with a truncation indicator, one or more properties that are applicable to the third class are omitted from the intermediate data structure for the first class. This is in contrast with the second class as described above, in that properties applicable to the second class are included in the intermediate data structure, whereas properties applicable to the third class are not included in the intermediate data structure.

The truncation indicator provides a way of truncating, or "clipping", the intermediate data structure, for example to prevent further (potentially infinite) recursion. As such, a distinction may be drawn between data contained within the intermediate data structure for the first class and relationships between different intermediate data structures for different classes. That is, the truncation indicator allows for a disambiguation of data that could potentially belong to different intermediate data structures. By associating the third class with the truncation indicator, properties, restrictions and sub-classes for the third class are prevented from being included in the intermediate data structure for the first class, and instead may be included in a separate intermediate data structure for the third class.

In embodiments, the first class and the third class form a subsumption cycle in the ontology. In such a subsumption cycle, the first class subsumes the third class, and the third class subsumes the first class. The truncation indicator may be associated with the third class due to the first class and the third class forming the subsumption cycle in the ontology. For example, the truncation indicator may be associated with the third class in response to the identification of such a subsumption cycle between the first class and the third class. Therefore, in the absence of the truncation indicator, potentially infinite recursion could occur, as the intermediate data structure for the first class would include a sub-structure for the third class, which in turn would include a sub-structure for the first class, and so on. By using the truncation indicator, the intermediate data structure for the first class is truncated at a desired point and such cyclic recursion is prevented.

In embodiments, the truncation indicator is associated with the third class based on user input. In other words, a user may decide which classes in the ontology are to be associated with a truncation indicator. For example, it may be desired that a certain class is to be associated with its own user interface for database data entry, rather than being incorporated into the user interface for the first class. Such user input may be provided when the database is generated, for example. In alternative embodiments, the association of the truncation indicator with the third class is machine-defined. For example, an algorithm may specify which classes in the ontology are to be associated with the truncation indicator. The association of particular classes with a truncation indicator may be part of the data model described in the ontology.

In embodiments, generating the intermediate data structure for the first class comprises identifying, based on the at least one property, a fourth class of the plurality of classes. The fourth class may be specified, for example, in the range field of the at least one property. In response to determining that the first class and the fourth class form a subsumption cycle in the ontology, one or more properties that are applicable to the fourth class are omitted from the intermediate data structure for the first class. Therefore, the intermediate data structure may be truncated based on the determination of the subsumption cycle between the first class and the fourth class. As such, a specific truncation indicator need not be used to truncate the intermediate data structure in such embodiments.

In embodiments, generating the intermediate data structure for the first class comprises deriving a property restriction function for at least one second further property of the plurality of properties. The at least one second further property subsumes the at least one property in the ontology. The property restriction function for the at least one property may be at least partially inherited from the property restriction function for the at least one second further property. As such, a restriction may be associated with the at least one property in the intermediate data structure either due to the restriction being directly applicable to the at least one property, or due to the restriction being applicable to a property which subsumes the at least one property in the ontology.

In embodiments, the intermediate data structure for the first class comprises a downward closed tree structure. The intermediate data structure is downward closed in that it contains sub-structures corresponding to subsumed classes, except for classes which are associated with a truncation indicator and/or which form a subsumption cycle with the first class. The intermediate data structure for the first class is therefore a tree in which each leaf corresponds to either a specific data point (e.g. a number, string, date, or any other specified data type) or a designator for a class which is to have its own intermediate data structure (e.g. a class that is associated with a truncation indicator and/or which forms a subsumption cycle with the first class), as will be described in more detail below. Truncation of the intermediate data structure (e.g. through use of the truncation indicator) prevents the intermediate data structure from forming an infinite tree.

At item 240, the intermediate data structure is outputted to cause construction of the user interface. In embodiments, for example where the method 200 is performed by the server apparatus 110, the data is outputted for transmission back to the client apparatus 120 via the network 115. In alternative embodiments, the data outputted is not transmitted to the client apparatus 120 via the network 115.

In embodiments, the intermediate data structure is converted into a JavaScript Object Notation (JSON) structure. JSON is a relatively lightweight data-interchange format that may be relatively easy for machines to interpret, parse and/or generate. In such embodiments, the JSON structure is outputted. For example, the JSON structure may be outputted for transmission to the client apparatus 120 via the network 115. The JSON structure is operable to generate the user interface. In embodiments, the JSON structure is interpretable to deterministically generate the user interface. In alternative embodiments, the intermediate data structure is not converted into a JSON structure. In some cases, the intermediate data structure is converted into an eXtensible Markup Language (XML) structure which is interpretable to deterministically generate the user interface. In some examples, the intermediate data structure is interpreted directly to generate the user interface, i.e. without first converting the intermediate data structure into a predetermined format for interpretation.

Figure 3:
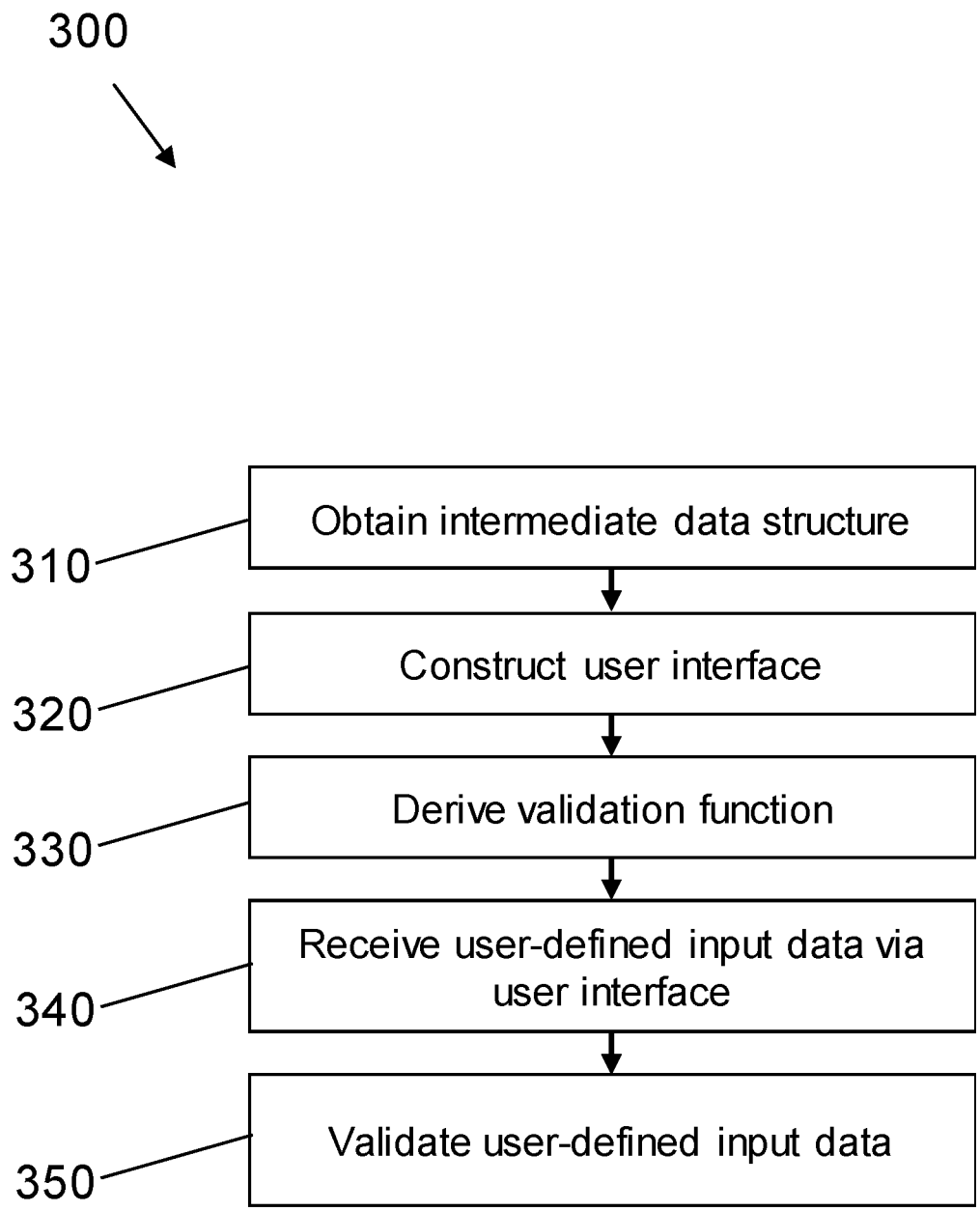
FIG. 3 shows a flow chart depicting a method for validating user-defined input data for a database according to embodiments of the present disclosure.

Referring to FIG. 3, there is shown a method 300 of validating user-defined input data for a database, according to embodiments of the present disclosure. The method 300 may be performed by an apparatus such as the server apparatus 110 or the client apparatus 120 described above. In embodiments, the steps of the method 300 may be combined with some or all of the steps of the method 200 described above. For example, the steps of the method 300 may be performed after the steps of the method 200 have been performed.

At item 310, an intermediate data structure for the first class in the ontology is obtained. The intermediate data structure is as described above. In some examples, the intermediate data structure, or data derived therefrom, is received. For example, where the method 300 is performed by the client apparatus 120, a JSON structure derived from the intermediate data structure may be received at the client apparatus 120. In some examples, obtaining the intermediate data structure comprises generating the intermediate data structure (e.g. where the method 300 is performed at least in part by the server apparatus 110).

At item 320, a user interface is constructed using the intermediate data structure. The user interface is associated with the first class. The user interface is useable to input user-defined data associated with the first class to a database. In embodiments, the user interface is generated in a deterministic manner using the intermediate data structure. In embodiments, the user interface is constructed in a web application. The intermediate data structure (or data derived therefrom) may be interpreted by a JavaScript application to create a user interface which includes all of the components required to construct a valid object. The intermediate data structure may be interpreted by a different type of application in alternative embodiments.

In embodiments, a meta ontology can be used to drive the interpretation of the intermediate data structure, to allow the user interface to be rendered in a flexible manner. In alternative embodiments, a developer can impose an ordering and/or structure on the information presented in the intermediate data structure.

At item 330, the intermediate data structure is used to derive a validation function for validating user-defined data inputted via the user interface. The validation function may be derived based on the properties that are included in the intermediate data structure, and/or the restrictions that are associated with the properties in the intermediate data structure. As such, the validation function may be derived based on the property restriction function for the at least one property applicable to the first class. In embodiments, the validation function is derived based on typing information. A validation function may be associated with each leaf and/or branch of the intermediate data structure (where each leaf and/or branch potentially allows user-defined instance data to be inputted).

At item 340, user-defined input data is received via the user interface. The user-defined input data is received in response to the intermediate data structure having been outputted (e.g. by the server apparatus 110).

At item 350, the user-defined input data is validated using the validation function.

In response to the validation function returning a positive result, the database is updated based on the user-defined input data. For example, data may be added to, deleted from and/or modified in the database. Where the method 300 is performed by the client apparatus 120, the client apparatus 120 may transmit data (e.g. via the HyperText Transfer Protocol (HTTP)) to the server apparatus 110 once the user-defined input data has been validated, to instruct the server apparatus 110 to update the database.

In response to the validation function returning a negative result, updating of the database is prevented. In some examples, an error message is generated in response to the validation function returning a negative result.

As such, the validation function may enable the user-defined input data to automatically meet the specification of the database, as defined by the data model described in the ontology. Thus, the intermediate data structure for the first class is useable, via the resulting user interface and/or validation function, to police user-defined input data before the database is updated.

Figure 4:
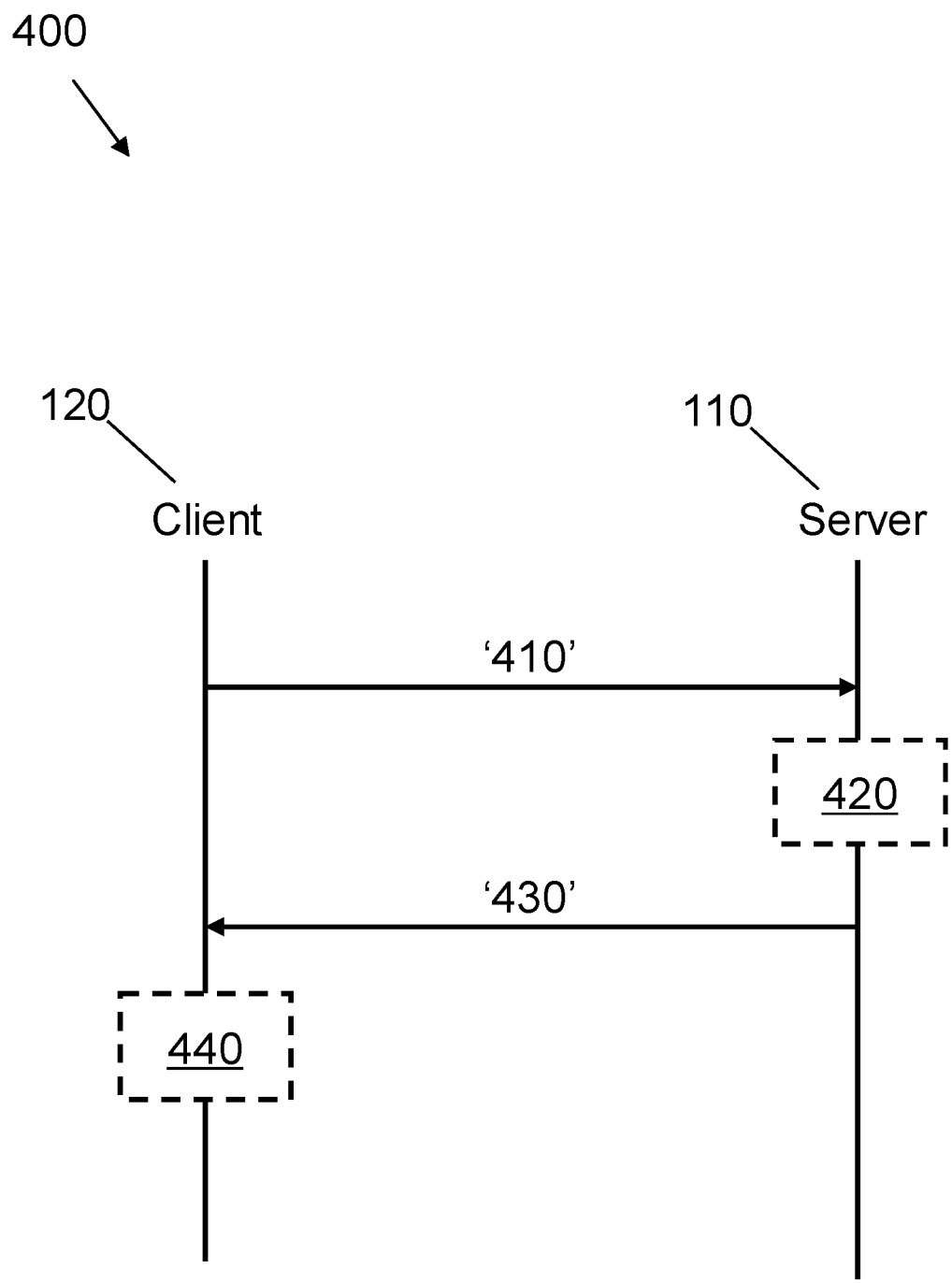
FIG. 4 shows a flow diagram for a method of facilitating construction of a user interface according to embodiments of the present disclosure.

FIG. 4 is a flow diagram for a method of facilitating construction of a user interface for policing input of user-defined data to a database, according to an embodiment of the present disclosure. In the embodiment shown in FIG. 4, the method is performed between the client apparatus 120 and the server apparatus 110 as described above. In alternative embodiments, the method is performed solely at the client apparatus 120 or solely at the server apparatus 110.

The client apparatus 120 sends, at item 410, data useable to identify a first class to the server apparatus 110. In embodiments, the data useable to identify the first class comprises a URI. The data useable to identify the first class may indicate the first class itself, or may indicate an object or element of the first class. For example, if the first class is "City", the data may indicate "City", or may indicate "Dublin" or another example of a city.

At item 420, the server apparatus 110 generates an intermediate data structure for the first class, as described above.

In this embodiment, the server apparatus 110 outputs, at item 430, a JSON structure derived from the intermediate data structure for the first class. The JSON structure is transmitted back to the client apparatus 120. In alternative embodiments, the server apparatus 110 outputs the intermediate data structure, and the client apparatus 120 converts the intermediate data structure to the JSON structure.

At item 440, the client apparatus 120 uses the JSON structure to construct a user interface for input of user-defined data to a database.

In embodiments, the server-client communication described with reference to FIG. 4 is implemented using HTTP. Other communication protocols may be used in alternative embodiments. In embodiments, the client-side processes are performed in a web application running on the client apparatus 120.

The client apparatus 120 may request an intermediate data structure for a new object within the specified class, or for an existing object within the specified class. Where the client apparatus 120 requests an intermediate data structure for an existing object (that is, an object belonging to the first class which already has instance data associated with it), the server apparatus 110 may fill the intermediate data structure with the existing instance data. The instance data may be provided at each leaf of the intermediate data structure, and an object designator (e.g. a URI) may be provided at each branch. The intermediate data structure may therefore represent a fully defined object with all of its display and type information. The instance data may subsequently be modified by a user via the user interface that is generated based on the intermediate data structure.

In embodiments, an unfilled intermediate data structure is sent to the client apparatus 120 (that is, an intermediate data structure without existing instance data). Such an unfilled intermediate data structure may be sent, for example, where a new object of the first class is to be added to the database. In some embodiments, a template for the intermediate data structure is generated and sent to the client apparatus 120.

Figure 5:
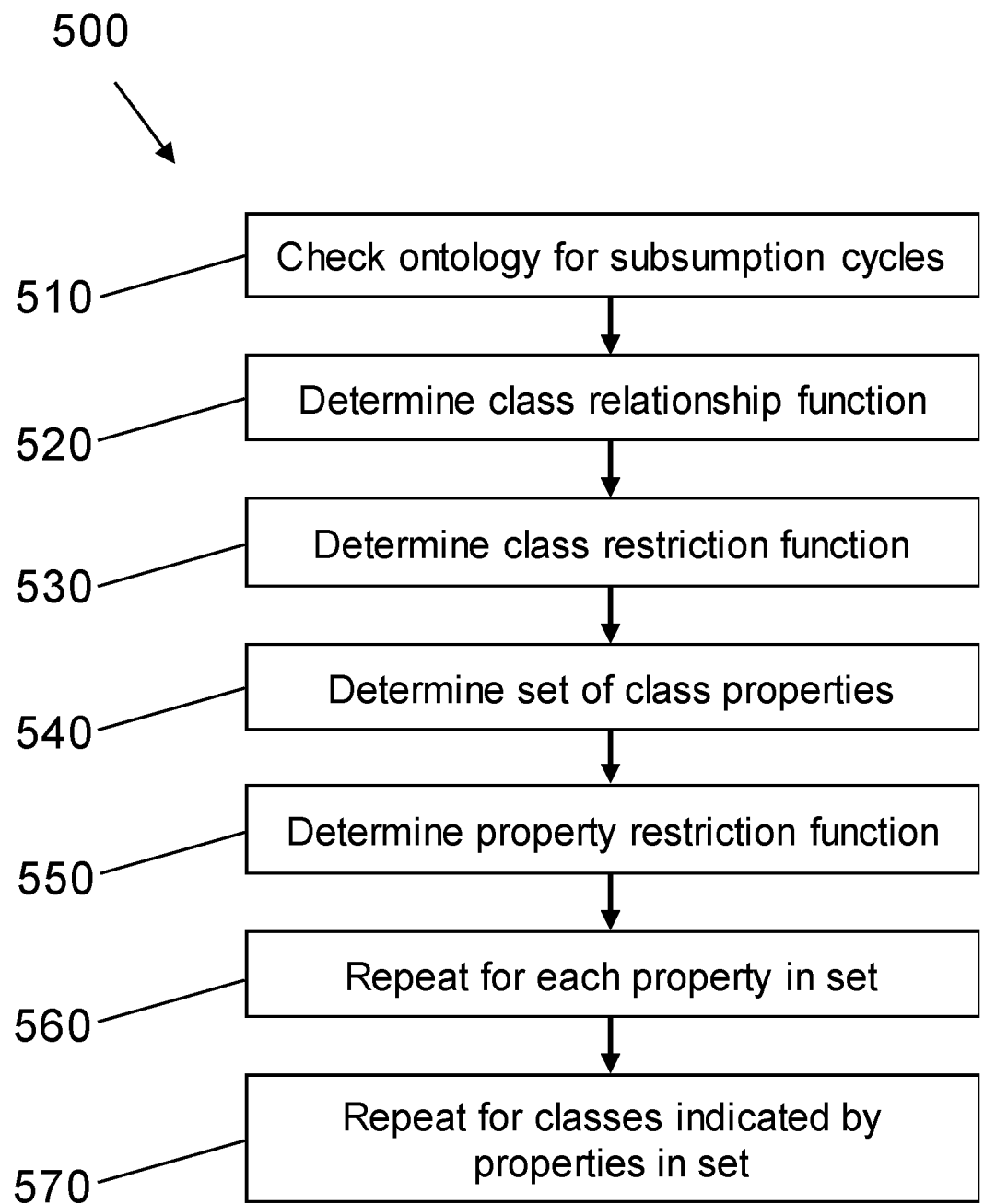
FIG. 5 shows a flow chart depicting a method of generating an intermediate data structure for facilitating constructing of a user interface according to embodiments of the present disclosure.

Referring to FIG. 5, there is shown a method 500 of generating an intermediate data structure for facilitating constructing of a user interface for input of user-defined data to a database, according to embodiments. The method 500 may be performed by an apparatus such as the server apparatus 110 or the client apparatus 120 described above. In embodiments, the steps of the method 500 may be combined with some or all of the steps of the method 200 and/or of the method 300 described above.

In the method 500, the intermediate data structure is generated for a class C, from an ontology O.

At item 510, the ontology O is checked for subsumption cycles (e.g. A<B<A). A subsumption cycle may be considered to yield a general equivalence of all intermediate classes. In embodiments, the ontology is simplified such that there are no subsumption cycles by creating an intermediate equivalence class from which each class in a given subsumption cycle is considered to be derived. This acts to truncate data structures which may otherwise recur infinitely. Such an intermediate equivalence class may be indicated using a predetermined truncation indicator. In alternative embodiments, the ontology is rejected if subsumption cycles are detected and/or a user is requested to remove the subsumption cycles from the ontology manually.

At item 520, a class relationship function, CF, for the class C is determined. The class relationship function is a syntactic representation of the logical description of the classes which are related to the class C according to the ontology O. Let the function which yields CF for C be cf (with type cf: Class->ClassFormula). This function is defined recursively and proceeds in the following manner. The definition of class C is read from the ontology O. If C is a subclass of a class D, then the class relationship function CF is the result of the function cf(C):=C<cf(D). If C is equivalent to a class D, then the class relationship function CF is the result of the function cf(C):=C=cf(D). If C is the intersection of a set of classes S then the class relationship function CF is the result of the function cf(C):=C=and (cf(X0), cf(X1), ..., cf(Xn)), for Xi in S. If C is the union of a set of classes S then the class relationship function CF is the result of the function cf(C):=C=xor(cf(X0), cf(x1), ..., cf(xn)), for Xi in S. If C is the inversion of a class D, then the class relationship function CF is the result of the function cf(C):=C=not(D).

At item 530, a class restriction function, RF, for the class C is determined from the class relationship function, CF. The class restriction function, RF, is derived by reducing the class relationship function, CF, to restrictions by interpreting non-restriction classes as 'true' and using the laws of first-order logic. The class restriction function, RF, is a syntactic representation of all restrictions related to the class C in the ontology O. An example class restriction function, RF, is: 'C<(D=and(A,B))', which reads as: C is subsumed by D which is equivalent to the intersection of the classes A and B.

At item 540, a set of class properties, CP, is determined for the class C. This is a set of properties which can logically apply to the class C, based on the properties whose domain is C in the ontology O. These may include functional restrictions, symmetric restrictions or other such restrictions which do not pertain specifically to classes.

At item 550, a property restriction function is determined for a given property in the set of properties, CP. The property restriction function is determined based on the class restriction function, RF. The restriction(s) that applies to the given property may be selected from the class restriction function, RF. In embodiments, the class restriction function syntax is traversed recursively, and a determination is made on whether or not a particular restriction can apply to the given property (e.g. if the property is named by the restriction, or is subsumed by a property that is named by the restriction). These restrictions are combined according to the logical content of the class restriction function, RF.

Let sp be a map from properties and restriction function to restrictions (that is, sp: Properties×Restriction Function->Restriction). If the restriction function for restriction R has a formula R=SF op TF, then the restriction of property P is sp(RF,P)=sp(SF,P) op sp(TF,P), for op in {or,and,xor,not,<}. If the restriction function for R applies to a named property Q, then the restriction of property P is sp(RF,P)=R iff P<Q (that is, if P is subsumed by Q) according to the ontology O. This forms one base case. If the restriction function for R does not apply to P, then sp(RF, P)=true (i.e. no restriction).

In embodiments, all restrictions that apply specifically to properties in the ontology O (rather than classes) are identified, and the restrictions are applied to the property P if they are of a property Q, where P<Q (Q subsumes P).

In embodiments, the class restriction function is normalized, by reducing logically redundant formulae (such as 'true and R'=>'It', or 'true or R'=>'true').

At item 560, the determination of the property restriction function is repeated for every property in the property set, CP.

At item 570, some or all of steps 510 to 560 are repeated for every class D, where D is specified in the range of a property in CP. The intermediate data structure is thus generated recursively, forming a downward closed tree structure.

Figure 6A:
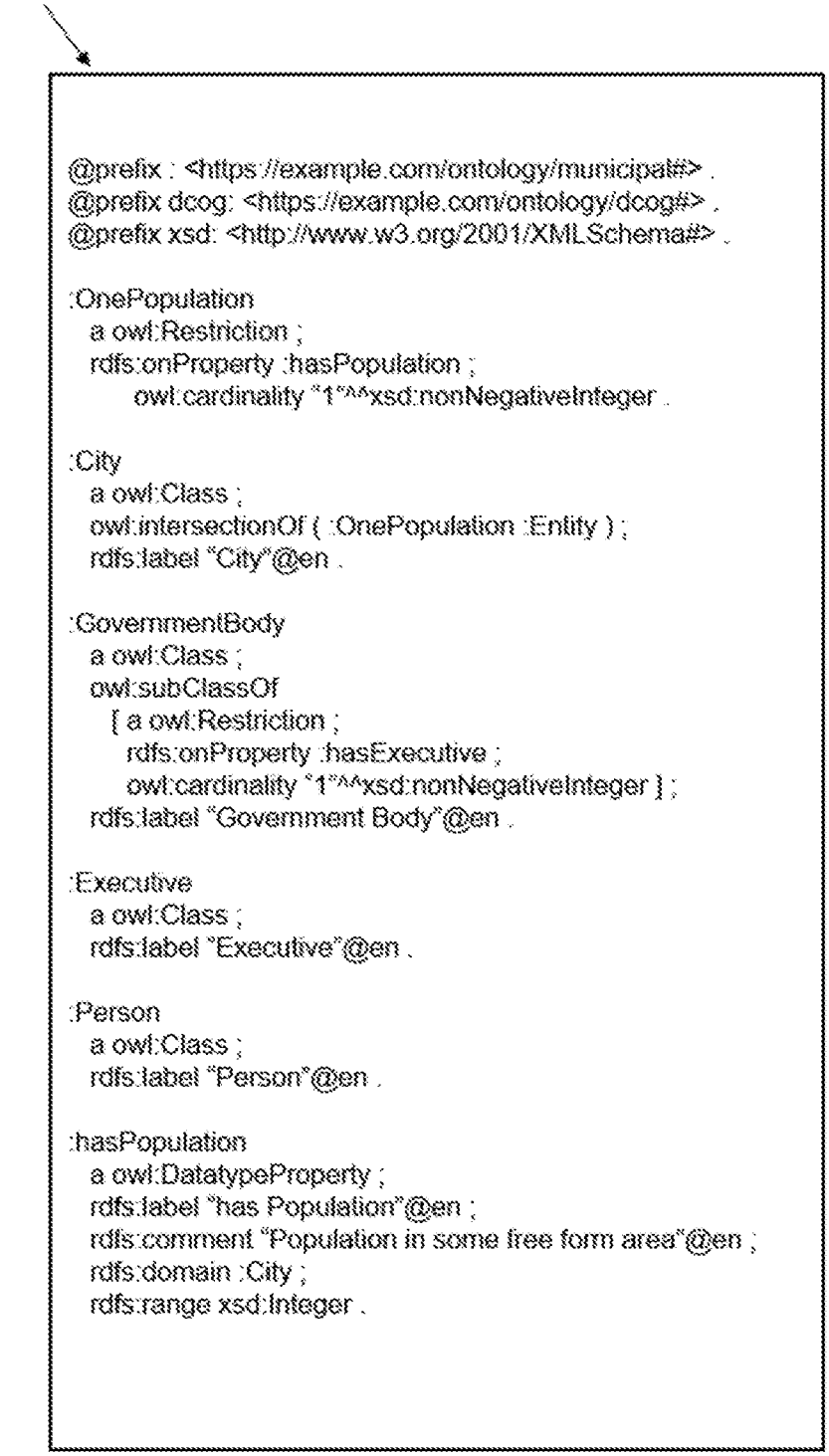

FIGS. 6A and 6B show an example ontology 600 according to embodiments of the present disclosure. The ontology 600 is expressed in OWL format. The ontology 600 may be used to generate an intermediate data structure for facilitating construction of a user interface for input of user-defined data to a database, as described above.

As shown in FIGS. 6A and 6B, the ontology 600 describes the following classes: 'City'; 'Government Body'; 'Executive'; 'Person'. The ontology 600 also describes the following properties, divided into object properties and datatype properties: 'hasPopulation'; 'governedBy'; 'sisterCity'; 'hasExecutive'; 'hasCouncillor'; 'firstName'; 'lastName'. Each of the properties has a domain and a range. The ontology 600 also describes the following restriction: 'OnePopulation'.

FIG. 6C shows a portion of an intermediate data structure 650 according to embodiments of the present disclosure. The intermediate data structure 650 is generated from the ontology 600 according to embodiments. The intermediate data structure 650 depicted in FIG. 6C is unfilled. That is, the intermediate data structure 650 comprises a template, or a "realiser", which does not contain specific instance data.

The intermediate data structure 650 is constructed as follows. An initial intermediate data structure is constructed for the entity class, 'City'. Entity is used in this example as a truncation indicator, and is associated with the class 'City'. This class has the class restriction formula: RF='City'<'Entity'<'Top' (subsumption by 'Top' is implicit in the semantics of OWL). Since no properties apply to 'Entity' or 'Top', the ontology is traversed to find properties whose domain is 'City'. This set of properties, SP, is {'Governed by', 'has Population', 'Sister City'}. Of this set, 'has Population' has a property restriction ('OnePopulation') requiring a cardinality of 1. This results in the portion of the intermediate data structure 650 depicted in FIG. 6C.

As shown in FIG. 6C, the property 'sisterCity' has both a domain and a range of 'City'. 'City' is associated with a truncation indicator, i.e. entity. Therefore, since 'sisterCity' leads to an entity, the intermediate data structure is truncated at that point. The type of the entity which is valid in the intermediate data structure is mentioned in the intermediate data structure.

The ellipses in the portion of the data structure 650 depicted in FIG. 6C denote the sub-structures which are to be constructed by recursively applying the intermediate data structure generation method to the class 'Government Body', which is in the range of the applicable property 'governedBy'. The sub-structure for 'Government Body' would similarly contain a sub-structure for the class 'Executive', which in turn would contain a sub-structure for the class 'Person', etc. As such, the full intermediate data structure for 'City' is a nested or hierarchically tiered structure.

Figure 7:
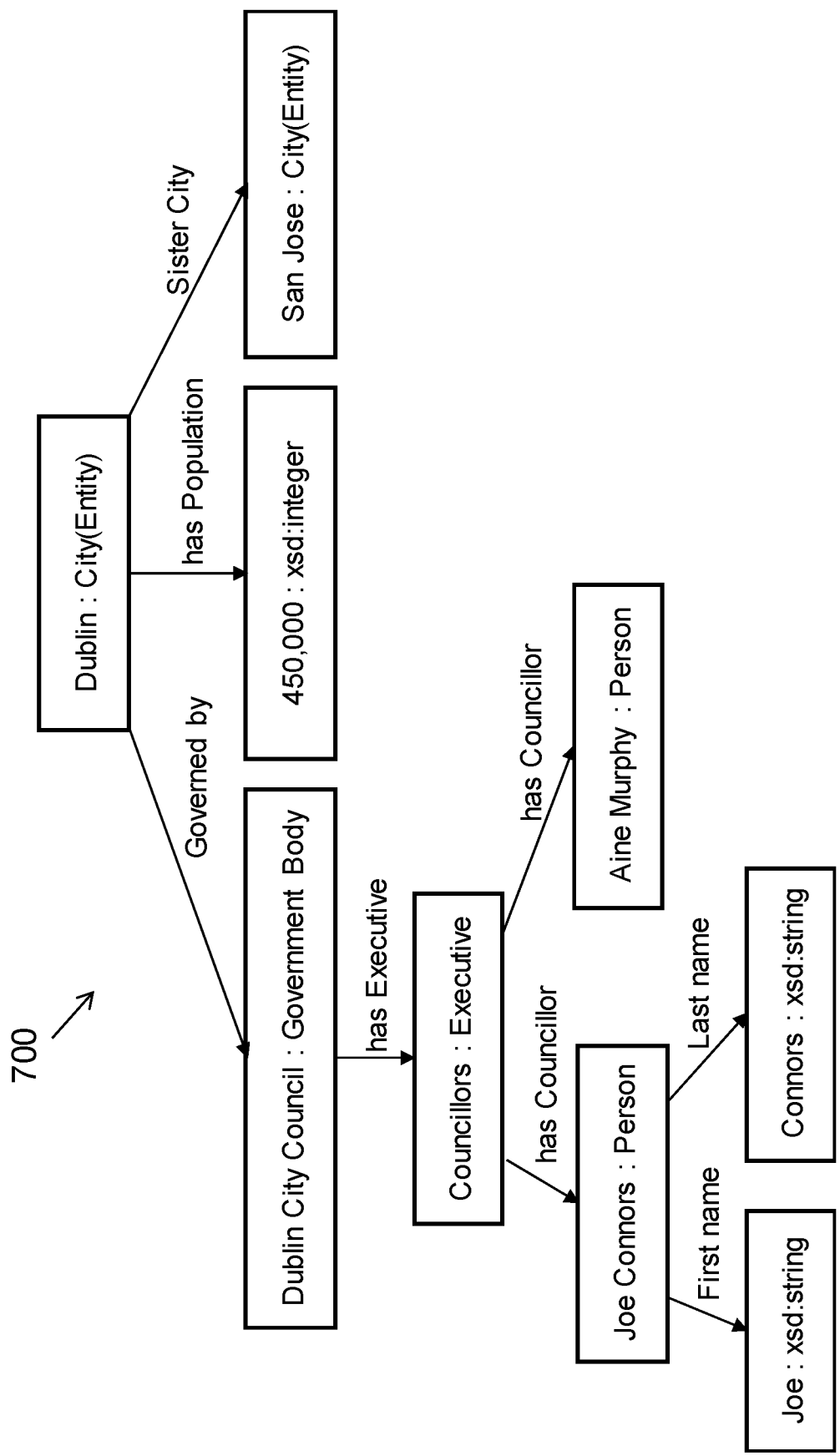
FIG. 7 shows a representation of an intermediate data structure according to embodiments of the present disclosure.

FIG. 7 shows a visual representation 700 of an intermediate data structure according to embodiments of the present disclosure. The intermediate data structure is generated from the ontology 600 shown in FIGS. 6A and 6B. The intermediate data structure as depicted in FIG. 7 is filled with instance data. The intermediate data structure is generated for the 'City' class, and filled with instance data for the object 'Dublin' within the 'City' class. In the depicted intermediate data structure, data values are shown on the left hand side of each field, and class or datatype labels are shown on the right hand side of each field.

As shown in FIG. 7, the intermediate data structure may be represented as a downward closed tree structure, in which every terminating leaf is either a data value (e.g. a string or integer as defined by the XML, schema (XSD)), or a designator for a further Entity (namely San Jose, the Sister City). The intermediate data structure is truncated at such a designator.

Figure 8:
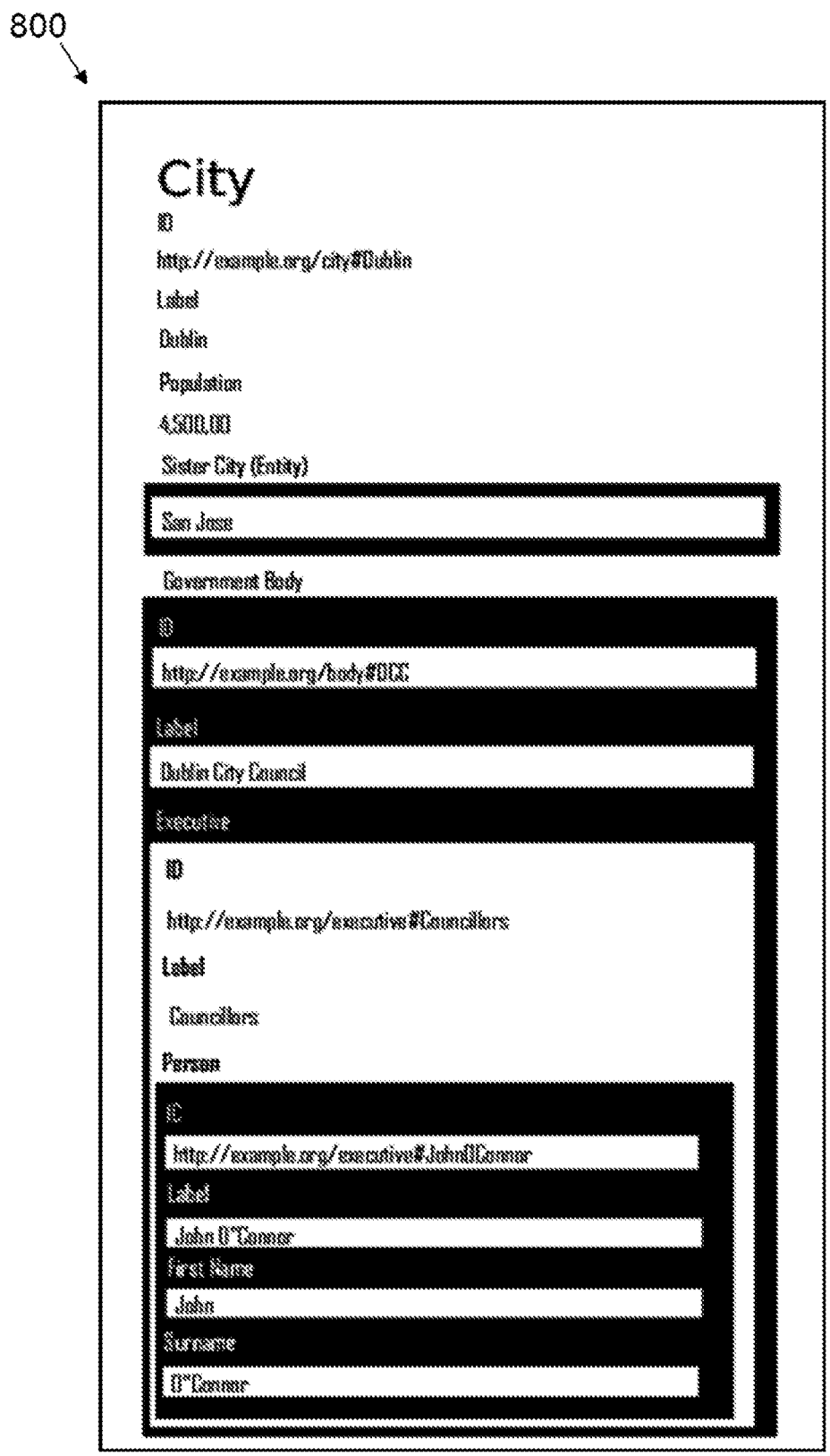
FIG. 8 shows a user interface for inputting user-defined data to a database according to embodiments of the present disclosure.

FIG. 8 shows a user interface 800 for input of user-defined data to a database. The user interface 800 is generated using the intermediate data structure depicted in FIG. 7, which in turn is derived from the ontology 600. In this example, the user interface 800 comprises a set of boxes within boxes. The boxes within boxes correspond to the nested structure of the intermediate data structure. User-defined instance data may be inputted in the various fields of the user interface 800. In these embodiments, the user interface 800 comprises a web form, e.g. constructed within a web application. User interfaces may take other forms in alternative embodiments.

Figure 9:
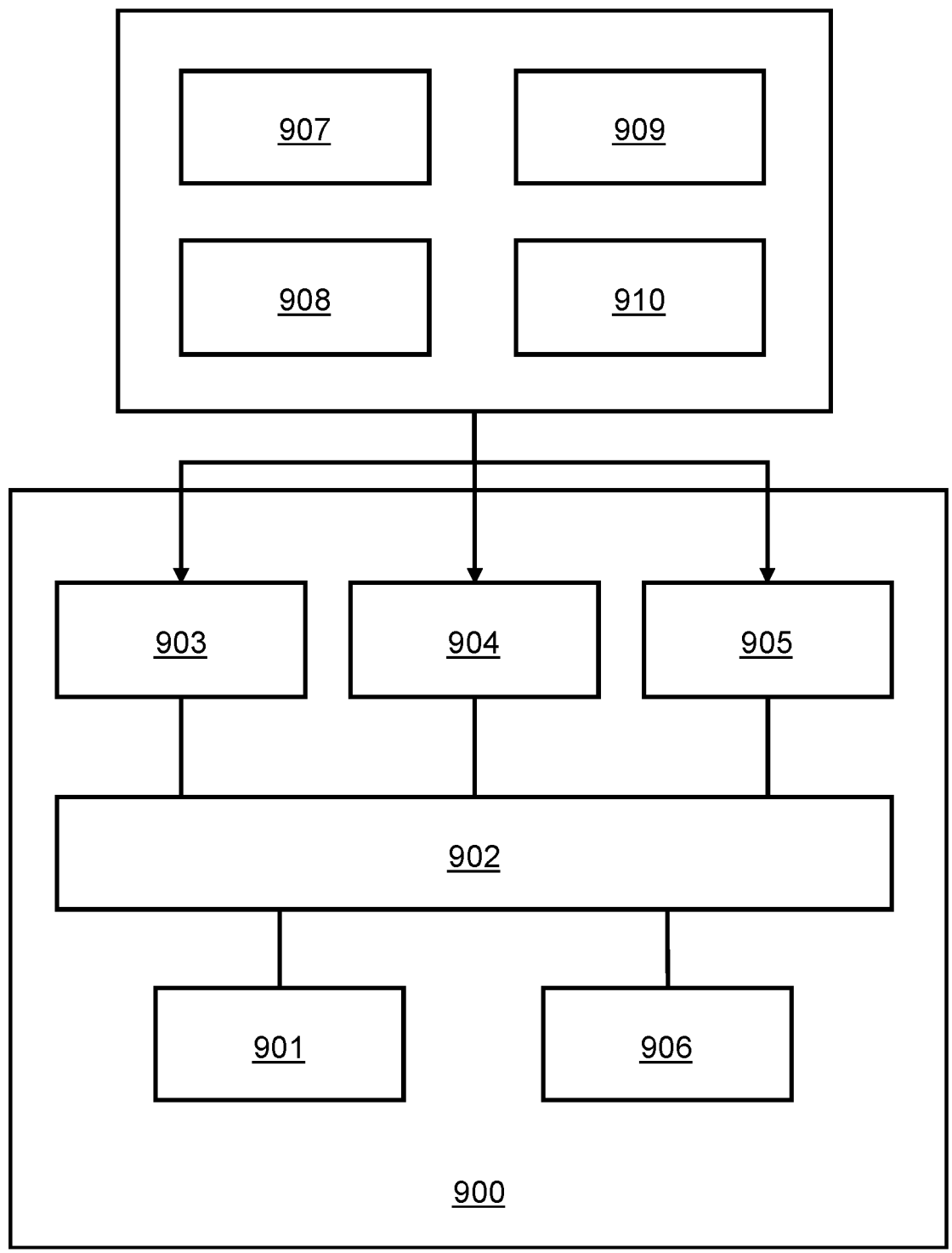
FIG. 9 shows schematically an apparatus according to embodiments of the present disclosure.

Referring to FIG. 9, there is shown a schematic block diagram of an example of an apparatus 900 for carrying out one of embodiments or parts thereof described herein. In embodiments, the apparatus 900 comprises a server. In alternative embodiments, the apparatus 900 comprises a client device.

Examples of apparatus 900 include, but are not limited to, a mobile computer, a personal computer system, a wireless device, base station, phone device, desktop computer, laptop, notebook, netbook computer, mainframe computer system, handheld computer, workstation, network computer, application server, storage device, a consumer electronics device, or in general any type of computing or electronic device.

In this example, the apparatus 900 comprises one or more processors 901 configured to process instructions and/or data. The one or more processors 901 may comprise a central processing unit (CPU). The one or more processors 901 are coupled with a bus 902. The one or more processors 901 may comprise multiple co-located processors or multiple disparately located processors. Operations performed by the one or more processors 901 may be carried out by hardware and/or software.

In this example, the apparatus 900 comprises at least one computer-useable volatile memory 903, at least one computer-useable non-volatile memory 904, and at least one data storage unit 905. The volatile memory 903, non-volatile memory 904 and/or data storage unit 905 are configured to store information and/or instructions for use by the one or more processors 901. The volatile memory 903, the non-volatile memory 904 and the data storage unit 905 are coupled with the bus 902. The volatile memory 903 may comprise random access memory (RAM). The non-volatile memory 904 may comprise read-only memory (ROM). The data storage unit 905 may comprise a magnetic or optical disk and disk drive or a solid-state drive (SSD).

In this example, the apparatus 900 comprises one or more input/output (I/O) devices 906 configured to communicate information to and/or from the one or more processors 901. The one or more I/O devices 906 are coupled with the bus 902. The one or more I/O devices 906 may comprise at least one network interface. The at least one network interface may enable the apparatus 900 to communicate via one or more data communications networks, e.g. the Internet. The one or more I/O devices 906 may comprise a user interface for receiving user input, for example.

Various other elements/entities are depicted for the apparatus 900. For example, when present, an operating system 907, processing module 908, one or more further modules 909, and data 910 are shown as residing in one, or a combination, of the volatile memory 903, non-volatile memory 904 and the data storage unit 905. The processing module 908 may be implemented by way of computer program code stored in memory locations within the non-volatile memory 904, computer-readable storage media within the data storage unit 905 and/or other tangible computer-readable storage media. Examples of tangible computer-readable storage media include, but are not limited to, an optical medium (e.g., CD-ROM, DVD-ROM or Blu-ray), flash memory card, floppy or hard disk or any other medium capable of storing computer-readable instructions such as firmware or microcode in at least one ROM or RAM or Programmable ROM (PROM) chips or as an Application Specific Integrated Circuit (ASIC). The apparatus 900 may therefore comprise a processing module 908 which can be executed by the one or more processors 901. The processing module 908 can be configured to include instructions to implement at least some of the operations described in the present disclosure. During operation, the one or more processors 901 launch, run, execute, interpret or otherwise perform the instructions in the processing module 908.

Although at least some aspects of the examples described herein with reference to the drawings comprise computer processes performed in processing systems or processors, examples described herein also extend to computer programs, for example computer programs on or in a carrier, adapted for putting the examples into practice. The carrier may be any entity or device capable of carrying the program.

It will be appreciated that the apparatus 900 may comprise more, fewer and/or different components from those depicted in FIG. 9.

The apparatus 900 may be located in a single location or may be distributed in multiple locations. Such locations may be local or remote.

The techniques described herein may be implemented in software or hardware, or may be implemented using a combination of software and hardware. They may include configuring an apparatus to carry out and/or support any or all of techniques described herein.

Whilst the present disclosure has been described and illustrated with reference to particular embodiments, it will be appreciated by those of ordinary skill in the art that the present disclosure lends itself to many different variations not specifically illustrated herein. By way of example only, certain possible variations will now be described.

In embodiments of the present disclosure, the user interface is constructed at the client apparatus 120. In alternative embodiments, the user interface is constructed at the server apparatus 110.

In embodiments of the present disclosure, the server apparatus 110 generates the intermediate data structure from the ontology. In alternative embodiments, the client apparatus 120 generates the intermediate data structure. In further alternative embodiments, a combination of the client apparatus 120 and the server apparatus 110 generate the intermediate data structure.

In embodiments, policing of the user-defined input data is performed at the client apparatus 120, and only after the user-defined input data has been validated is such data sent to the server apparatus 110 for updating the database. As such, less traffic may be sent to the server apparatus 110 compared to a case in which all input data is transmitted to the server apparatus 110. In alternative embodiments, all user-defined input data is sent to the server apparatus 110, and the server apparatus 110 performs the validation of the input data.

In embodiments of the present disclosure, the ontology describes a plurality of classes including the first class. In alternative embodiments, the ontology describes the first class only.

In alternative embodiments, one or more of the class relationship function, class restriction function and property restriction function are not derived as part of generating the intermediate data structure.

In embodiments of the present disclosure, each of the properties in the ontology comprises a domain field and a range field. In alternative embodiments, properties in the ontology do not comprise the domain field and/or the range field. In such cases, the properties that are applicable to a given class may be identified in other ways, e.g. labelling.

In embodiments of the present disclosure, the ontology is expressed in an OWL knowledge representation language. The ontology may be expressed in other languages (including non-OWL languages) in alternative embodiments.

In embodiments of the present disclosure, one or more properties that are applicable to a class that forms a subsumption cycle with a first class and/or that is associated with a truncation indicator are omitted from the intermediate data structure for the first class. In alternative embodiments, such properties are included in the intermediate data structure for the first class. In such cases, the intermediate data structure may still be truncated, but only after such properties have been included.

In embodiments of the present disclosure, a user interface that corresponds to the intermediate data structure is constructed. In alternative embodiments, the constructed user interface corresponds to only a portion of the intermediate data structure.

In alternative embodiments, the ontology does not comprise any subsumption cycles. Nevertheless, a truncation indicator may be used to denote a point at which a particular intermediate data structure (and consequently a particular user interface) is to be truncated.

Where in the foregoing description, integers or elements are mentioned which have known, obvious or foreseeable equivalents, then such equivalents are herein incorporated as if individually set forth. It will also be appreciated that integers or features of the present disclosure that are described as preferable, advantageous, convenient or the like are optional and do not limit the scope of the independent claims. Moreover, it is to be understood that such optional integers or features, whilst of possible benefit in some embodiments, may not be desirable, and may therefore be absent, in other embodiments.

The features of any dependent claim may be combined with the features of any of the independent claims or other dependent claims. Features described in relation to one example or embodiment may be used in other described examples or embodiments, e.g. by applying relevant portions of that disclosure.

What is claimed is:

1. A method of facilitating construction of a user interface for policing input of user-defined data to a database, the method comprising:
    obtaining an ontology expressed in a first-order logic language, the ontology describing one or more predefined classes, a plurality of predefined properties and at least one predefined restriction;
    receiving data useable to identify a first class of the one or more predefined classes;
    in response to the receiving, generating, for the first class, an intermediate data structure configured to facilitate construction of the user interface for policing input of user-defined data to the database; and
    outputting the intermediate data structure to cause construction of the user interface,
    wherein generating the intermediate data structure comprises:
        identifying at least one property of the plurality of predefined properties from the ontology that is applicable to the first class;
        including the at least one property in the intermediate data structure;
        determining, for the at least one property, a property restriction function indicating whether the at least one predefined restriction from the ontology is applicable to the at least one property; and
        in response to the property restriction function indicating that the at least one predefined restriction is applicable to the at least one property, associating the at least one predefined restriction with the at least one property in the intermediate data structure.

2. The method according to claim 1, wherein generating the intermediate data structure involves interpreting the ontology using a closed-world assumption.

3. The method according to claim 1, wherein generating the intermediate data structure further comprises:
identifying a group of multiple properties from the plurality of predefined properties that is applicable to the first class; and
repeating the including, determining and associating for each property in the group of multiple properties.

4. The method according to claim 1, wherein the ontology describes a plurality of predefined classes including the first class.

5. The method according to claim 4, wherein generating the intermediate data structure further comprises deriving a class relationship function for the first class, the class relationship function indicating a relationship in the ontology between the first class and at least one further class of the plurality of predefined classes.

6. The method according to claim 5, wherein:
the class relationship function indicates that the first class subsumes the at least one further class in the ontology,
the generating the intermediate data structure for the first class comprises generating an intermediate data structure for the at least one further class, the intermediate data structure for the at least one further class comprising one or more properties from the ontology that are applicable to the at least one further class, and
the intermediate data structure for the first class subsumes the intermediate data structure for the at least one further class.

7. The method according to claim 5, wherein generating the intermediate data structure further comprises:
deriving, based on the class relationship function, a class restriction function for the first class, the class restriction function indicating one or more restrictions from the ontology that are related to the first class; and
using the class restriction function for the first class to derive the property restriction function.

8. The method according to claim 4, wherein generating the intermediate data structure further comprises:
identifying, based on the at least one property, a second class of the plurality of predefined classes;
identifying at least one first further property of the plurality of predefined properties from the ontology that is applicable to the second class; and
repeating the including, determining and associating for the at least one first further property,
wherein the second class is subsumed by the first class in the ontology.

9. The method according to claim 8, wherein:
the intermediate data structure comprises a hierarchical structure having multiple tiers,
a first tier of the hierarchical structure comprises the at least one property of the plurality of predefined properties, and
a second, different, tier of the hierarchical structure comprises the at least one first further property of the plurality of predefined properties.

10. The method according to claim 4, wherein generating the intermediate data structure further comprises:
identifying, based on the at least one property, a third class of the plurality of predefined classes; and
in response to determining that the third class is associated with a truncation indicator, omitting one or more properties that are applicable to the third class from the intermediate data structure,
wherein the first class and the third class form a subsumption cycle in the ontology, and
wherein the truncation indicator is associated with the third class due to the first class and the third class forming the subsumption cycle in the ontology.

11. The method according to claim 1, wherein:
generating the intermediate data structure further comprises deriving a property restriction function for at least one second further property of the plurality of predefined properties, the at least one second further property subsuming the at least one property in the ontology, and
the property restriction function for the at least one property is at least partially inherited from the property restriction function for the at least one second further property.

12. The method according claim 1, wherein identifying the at least one property is based on a domain field of the at least one property specifying the first class or specifying a further class that subsumes the first class in the ontology.

13. The method according to claim 1, wherein the intermediate data structure comprises a downward closed tree structure.

14. The method according to claim 1, further comprising constructing the user interface using the intermediate data structure.

15. The method according to claim 1, further comprising:
using the intermediate data structure to derive a validation function for validating user-defined data inputted via the user interface;
in response to outputting the intermediate data structure, receiving user-defined input data via the user interface;
validating the user-defined input data using the validation function;
in response to the validation function returning a positive result, updating the database based on the user-defined input data; and
in response to the validation function returning a negative result, preventing updating of the database.

16. The method according to claim 1, wherein the data useable to identify the first class comprises a Uniform Resource Indicator (URL).

17. The method according to claim 1, wherein the first-order logic language comprises a Web Ontology Language.

18. The method according to claim 1, further comprising:
converting the intermediate data structure into a JavaScript Object Notation (JSON) structure; and
outputting the JSON structure, wherein the JSON structure is operable to generate the user interface.

19. A computer program product comprising a non-transitory computer-readable storage medium having computer-readable instructions stored thereon, the computer-readable instructions being executable by a computerized device to cause the computerized device to perform a method of facilitating construction of a user interface for policing input of user-defined data to a database, the method comprising:
obtaining an ontology expressed in a first-order logic language, the ontology describing one or more predefined classes, a plurality of predefined properties and at least one predefined restriction;
receiving data useable to identify a first class of the one or more predefined classes;
in response to the receiving, generating, for the first class, an intermediate data structure configured to facilitate construction of the user interface for policing input of user-defined data to the database; and outputting the intermediate data structure to cause construction of the user interface, wherein generating the intermediate data structure comprises:

identifying at least one property of the plurality of predefined properties from the ontology that is applicable to the first class;

including the at least one property of the plurality of predefined properties from the ontology in the intermediate data structure;

determining, for the at least one property, a property restriction function indicating whether the at least one predefined restriction from the ontology is applicable to the at least one property; and in response to the property restriction function indicating that the at least one predefined restriction is applicable to the at least one property, associating the at least one predefined restriction with the at least one property in the intermediate data structure.

20. An apparatus comprising:

at least one processor; and at least one memory including computer program code, the at least one memory and the computer program code being configured to, with the at least one processor, cause the apparatus at least to perform a method of facilitating construction of a user interface for policing input of user-defined data to a database, the method comprising:

obtaining an ontology expressed in a first-order logic language, the ontology describing one or more predefined classes, a plurality of predefined properties and at least one predefined restriction;

receiving data useable to identify a first class of the one or more predefined classes;

in response to the receiving, generating, for the first class, an intermediate data structure configured to facilitate construction of the user interface for policing input of user-defined data to the database; and outputting the intermediate data structure to cause construction of the user interface, wherein generating the intermediate data structure comprises:

identifying at least one property of the plurality of predefined properties from the ontology that is applicable to the first class;

including the at least one property of the plurality of predefined properties from the ontology in the intermediate data structure;

determining, for the at least one property, a property restriction function indicating whether the at least one predefined restriction from the ontology is applicable to the at least one property; and in response to the property restriction function indicating that the at least one predefined restriction is applicable to the at least one property, associating the at least one predefined restriction with the at least one property in the intermediate data structure.

* * * * *